United States Patent
Arimilli et al.

(10) Patent No.: US 7,073,043 B2
(45) Date of Patent: Jul. 4, 2006

(54) MULTIPROCESSOR SYSTEM SUPPORTING MULTIPLE OUTSTANDING TLBI OPERATIONS PER PARTITION

(75) Inventors: Ravi Kumar Arimilli, Austin, TX (US); Guy Lynn Guthrie, Austin, TX (US); Kirk Samuel Livingston, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 10/425,425

(22) Filed: Apr. 28, 2003

(65) Prior Publication Data

US 2004/0215898 A1 Oct. 28, 2004

(51) Int. Cl.
*G06F 12/00* (2006.01)

(52) U.S. Cl. .................. 711/207; 711/146; 711/35; 711/144

(58) Field of Classification Search ............ 711/207, 711/146, 135, 144
See application file for complete search history.

(56) References Cited

U.S. PATENT DOCUMENTS

| | | | | |
|---|---|---|---|---|
| 5,437,017 A | * | 7/1995 | Moore et al. .............. | 709/213 |
| 5,613,083 A | * | 3/1997 | Glew et al. ................ | 711/207 |
| 5,906,001 A | * | 5/1999 | Wu et al. ................... | 711/154 |
| 5,996,085 A | * | 11/1999 | Cheong et al. ............ | 713/400 |
| 6,105,113 A | * | 8/2000 | Schimmel .................. | 711/146 |
| 6,119,204 A | * | 9/2000 | Chang et al. .............. | 711/141 |
| 6,189,078 B1 | * | 2/2001 | Bauman et al. ............ | 711/156 |
| 6,263,403 B1 | * | 7/2001 | Traynor .................... | 711/133 |
| 6,345,352 B1 | * | 2/2002 | James et al. .............. | 711/210 |
| 6,633,967 B1 | * | 10/2003 | Duncan .................... | 711/207 |

* cited by examiner

*Primary Examiner*—Matthew D. Anderson
*Assistant Examiner*—Ryan A. Dare
(74) *Attorney, Agent, or Firm*—Casimer K. Salys; Dillon & Yudell LLP (57) ABSTRACT

Disclosed is a symmetric multiprocessor data processing system (SMP) that implements a TLBI protocol, which enables multiple TLBI operations from multiple processors within a partition to complete concurrently. Thus, a global TLB lock, synchronization, and TLB unlock is not necessary. When a TLBI instruction is executed, the master dynamically manages the behavior of the TLBI operation based on asynchronously snooping another TLBI. If concurrent TLBI management is required, then the master dynamically degrades the TLBI to a "barrier" class instruction.

20 Claims, 8 Drawing Sheets

MULTIPROCESSOR SYSTEM SUPPORTING MULTIPLE OUTSTANDING TLBI OPERATIONS PER PARTITION

CROSS REFERENCE TO RELATED APPLICATIONS

The present application shares specification text and figures with the following co-pending applications, which were filed concurrently with the present application: application Ser. No. 10/425,401 "Enhanced TLBI Mechanism With Speculative Instruction Execution;" application Ser. No. 10/425,402 "Multiprocessor System With Retry-less TLBI Protocol;" The contents of the co-pending applications are incorporated herein by reference.

BACKGROUND OF THE INVENTION

1. Technical Field

The present invention relates generally to data processing systems and in particular to translation look-aside buffers (TLBs) in processors of multiprocessor data processing systems (multiprocessor systems). Still more particularly, the present invention relates to a method and system for preventing traditional delays caused by multiple TLB invalidate instructions in a multiprocessor system.

2. Description Of The Related Art

A typical symmetric multiprocessor data processing system (SMP) includes at least two processors (or central processing units (CPUs)), a memory, and input/output (I/O) devices. Each processor is made up of logic and other components that include a plurality of execution units at a cache subsystem level (or cache coherency level) utilized to execute address instructions that access memory. The address instructions are loaded/fetched from an instruction cache (or memory) and following initial processing (e.g., by load/store unit (LSU)) forwarded to queues associated with these execution units.

Depending on system design, these queues may include separate queues for load instructions, store instructions, pre-fetch instructions, etc. The queues operate as FIFO (first-in first-out) queues so that queued instructions are executed in order; However, the net effect of having separate queues for each execution unit is that the individual instructions may be executed out-of-order with respect to the actual instruction sequence.

Memory is made up of logic components and a sequence of individual blocks within which a page of instructions (or data) may be stored. The blocks contain numerous physical locations, each of which has an assigned real address. The real addresses are associated with each instruction executed by the processor that requires memory access (e.g. load and store instructions). A real address thus allows access to the associated physical location in memory for storing and loading the instructions and/or data utilized by the processor's execution units.

In order to improve system operation at the application and process level, many computer systems today utilize virtual memory systems to manage and allocate memory to various processes executed by the processors. Virtual memory systems allow each process to operate as if that process has control of the full range of addresses provided by the system without requiring the actual real address. The operating system maps the virtual address space for each process to the actual physical space for the system, and the mapping from a virtual address to a real address is typically managed through the use of a page frame table (PFT) maintained in memory. The PFT comprises a page directory and a table of virtual and real address translation pairs, each individually referred to as a Page Table Entry (PTE).

All memory access operations by the processors (e.g., instruction fetches, load/store instructions, memory prefetch) require real addresses. However, when instructions that perform memory access operations are initially fetched and processed by the processor, virtual addresses are typically obtained. Therefore, prior to scheduling the instruction for execution (i.e., placing the instruction within an execution queue associated with the load/store unit (LSU), the virtual address within the instruction must be translated into a corresponding real address. The LSU executes the memory access instruction to obtain the virtual address, which is translated by the TLB to get the real address. Since the address translation pairs are maintained by the PFT stored in memory, each translation operation traditionally required a memory access to complete the translation.

In order to reduce the number of main memory accesses to the PFT to perform virtual-to-real address translations, each processor in current systems is provided with a small cache for the most recently accessed PTEs called a translation lookaside buffer (TLB). The TLB reduces the latency associated with translations by reducing the need to access the PFT in main memory. Since the latency for most virtual-to-real address translations via the TLB is relatively small, overall processor performance is increased.

Thus, when address instructions are received by the LSU, the instructions that require an address translation are first sent to the TLB. When an entry corresponding to a virtual address of an instruction is found within the TLB, the TLB asserts a "HIT" signal and the real address is used. The instruction with the real address is then placed in an execution queue for execution within the memory subsystem (which includes each level of cache and the main memory). Depending on the number and length of the queues, many instructions with translated real addresses may be in these queues at any given time during program execution.

If a required translation for a particular virtual address is not present in the TLB, a "translation miss" occurs and the PTE needed to perform the address translation is retrieved from the PFT in memory by hardware and/or the operating system (OS) as is known in the art.

Occasionally, a PTE within the PFT needs to be modified in order for the Virtual Memory Manager (VMM) of the Operating System (OS) to manage system memory. These changes result in the processor's TLB containing a stale PTE. In order to maintain coherency and prevent processors from obtaining incorrect translations results from the TLBs, the OS first invalidates the appropriate PTE, and then issues a TLBI to invalidate the respective TLB.

In TLB consistency schemes, stale TLB entries are typically removed by a master processor that broadcasts TLB invalidate (TLBI) operations to all other processors in the multiprocessor system. The TLBI operation identifies the virtual address of the PTE to be invalidated. The TLBI is an address only operation and is first received at the master processor (i.e., the processor that issued the request for the translation) to invalidate its own TLB. When the TLBI is received, the TLBI is inserted into the fetched instruction stream being sent to the processor's TLB. The TLBI is also issued on the interconnect by the master processor. In current systems, each TLBI is followed by a "barrier" instruction (e.g., the SYNC instruction for PowerPC), which is issued out on the interconnect immediately following the TLBI. The master processor then waits for an acknowledgment message from each other processor.

When a TLBI is snooped by another processor, the TLBI is sent to the TLB controller, which invalidates the PTE within the TLB and sets a flag to each active queue with a previously translated address. The flag gets reset once the queue has moved to the real addressed cache coherent subsystem. The TLB controller then ensures all flags are reset before issuing a TLBI complete message to the cache coherent subsystem. Because of the earlier scheduling of instructions with the translated addresses within the queues, however, the TLBI logic has to initiate a flush of all the execution unit queues and wait until the flush completes before allowing the TLBI complete message to be returned to the requesting processor. In the meantime, the master processor waits for a return of a completion message for the barrier operation indicating the TLBI (and previously issued instructions) has completed at all the other processors.

Because the TLBI and barrier operation pair requires a flush of the queues in each other processor before a TLBI completion message can be generated, a problem occurs if multiple processors are allowed to issue and snoop multiple TLBIs. These problems include the overlapping TLBIs waiting indefinitely on each other to complete at a given processor, resulting in a stall of the processor's execution. Also, the multiple TLBIs compete for the bus resources and access to the PFT. To overcome these problems, most current systems require each processor within a partition to first acquire a "global TLBI lock," issue the appropriate TLBIs, and then release the lock. This lock acquisition and subsequent processes severely limits performance of the overall system.

The present invention recognizes that what is needed is a method and system within a multiprocessor system for invalidating entries in a TLB without requiring a lock on the PFT by a single processor. A method and system that enables multiple concurrent (or overlapping) TLBI operations issued from multiple processors within a partition would be a welcomed improvement. These and other benefits are provided by the invention described below.

The present invention recognizes that it would be desirable to enable a data processing system to reduce the delays when resuming execution following a complete draining of instructions from the execution unit queues during a TLBI operation. A data processing system that enables advanced queuing and execution of TLBI instructions out-of-order with respect to other instructions that require access to the TLB would be a welcomed improvement. The invention further realizes that it would be beneficial to speculatively execute instructions that are fetched after a TLBI and place instructions fetched before the TLBI into their respective execution queues to enable quicker recovery of a processor after the completion of the TLBI operation. The invention also recognizes the benefits of providing virtual address history of speculatively scheduled instructions so that those instructions with invalidated addresses may appropriately be targeted for draining during a TLBI operation. These and other benefits are provided by the invention described below.

The present invention recognizes that it would be desirable to provide a multiprocessor data processing system that enables multiple, concurrent (or overlapping) TLBIs executing on the interconnect with optimal snooper performance. A method and system that efficiently tracks multiple TLBIs issued from different processors to quickly indicate a system-wide completion of a processor issued TLBI without requiring global barrier operations would be a welcomed improvement. These and other benefits are provided by the invention described below.

SUMMARY OF THE INVENTION

Disclosed is a symmetric multiprocessor data processing system (multiprocessor system) that implements a TLBI protocol, which enables multiple TLBI operations from multiple processors within a partition to complete concurrently. The multiprocessor system comprises a plurality of processors each having a cache coherent subsystem with execution units and affiliated queues and a translation lookaside buffer (TLB) and associated TLB logic. Each processor further comprises a snooper that snoops all TLB invalidates (TLBIs) issued on the interconnect and initiates the invalidation of the associated TLB entry by the TLB logic.

When a TLBI is received to invalidate an entry in the master processor's TLB, the processor initiates a TLBI protocol, which causes the TLBI to be handled similarly to a local barrier instruction. The corresponding TLB entry is invalidated. Also, forwarding of fetched instructions to the execution unit queues is stopped, processing by the execution units is suspended, and the queued instructions within the execution unit queues are removed. After the queues have fully drained, the TLBI is issued on the interconnect to invalidate the corresponding entries in the TLBs of other snooping processors.

Accordingly, because of the initial draining of the queues, when another processor is snooped, the processor is able to quickly invalidate the TLB entry and immediately respond with a completion message without having to wait for its queues to drain. Delay caused primarily by waiting on the queues of another processor to drain is substantially eliminated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention provides an improved TLBI protocol that enables completion of multiple, concurrent TLBIs issued by different processors within a multiprocessor system. In prior art, only one processor within a partition could issue a TLBI at a time due to the asynchronous nature of multiple processors accessing the TLBs and PFT and software managed coherency for the TLBs. Thus, invalidating the TLBs involved a tedious process, which required the requesting processor to obtain a lock, invalidate the PTE in the PFT, issue a TLBI (to invalidate the TLBs) and then release the lock.

The invention enables concurrent TLBI operations and concurrent access to the PFT without the requesting processor(s) requiring a lock. The invention introduces several additional components within the processor that enables the TLBI protocol to complete the various functions (processes) of the invention. Among these processes are: (1) speculative scheduling of instructions to execution queues prior to completion of the TLBI operation; (2) non-speculative scheduling of instructions following the TLBI; (3) scheduling TLBIs asynchronously with other instructions within the processor; and (4) processor-by-processor monitoring of the completion of an issued TLBI without a barrier operation (i.e., a sync operation in PowerPC), etc. For purposes of the invention, TLBI is defined as the mnemonic of the actual instruction that ultimately causes the implementation of a TLBI process involving invalidation of a PTE in TLBs, issuing of a TLBI operation on the interconnect, and waiting for (or tracking) completion of the TLBI process at the other processors.

With reference now to the figures and in particular with reference to FIG. 1, there is illustrated a multiprocessor (multiprocessor system) data processing system (referred to hereinafter as multiprocessor system 100) within which features of the invention may advantageously be implemented. As shown, multiprocessor system 100 comprises multiple processors 101, which are coupled to memory 130 via interconnect 125. Interconnect 125 may comprise a single bus, multiples buses, or a switch.

Figure 1:
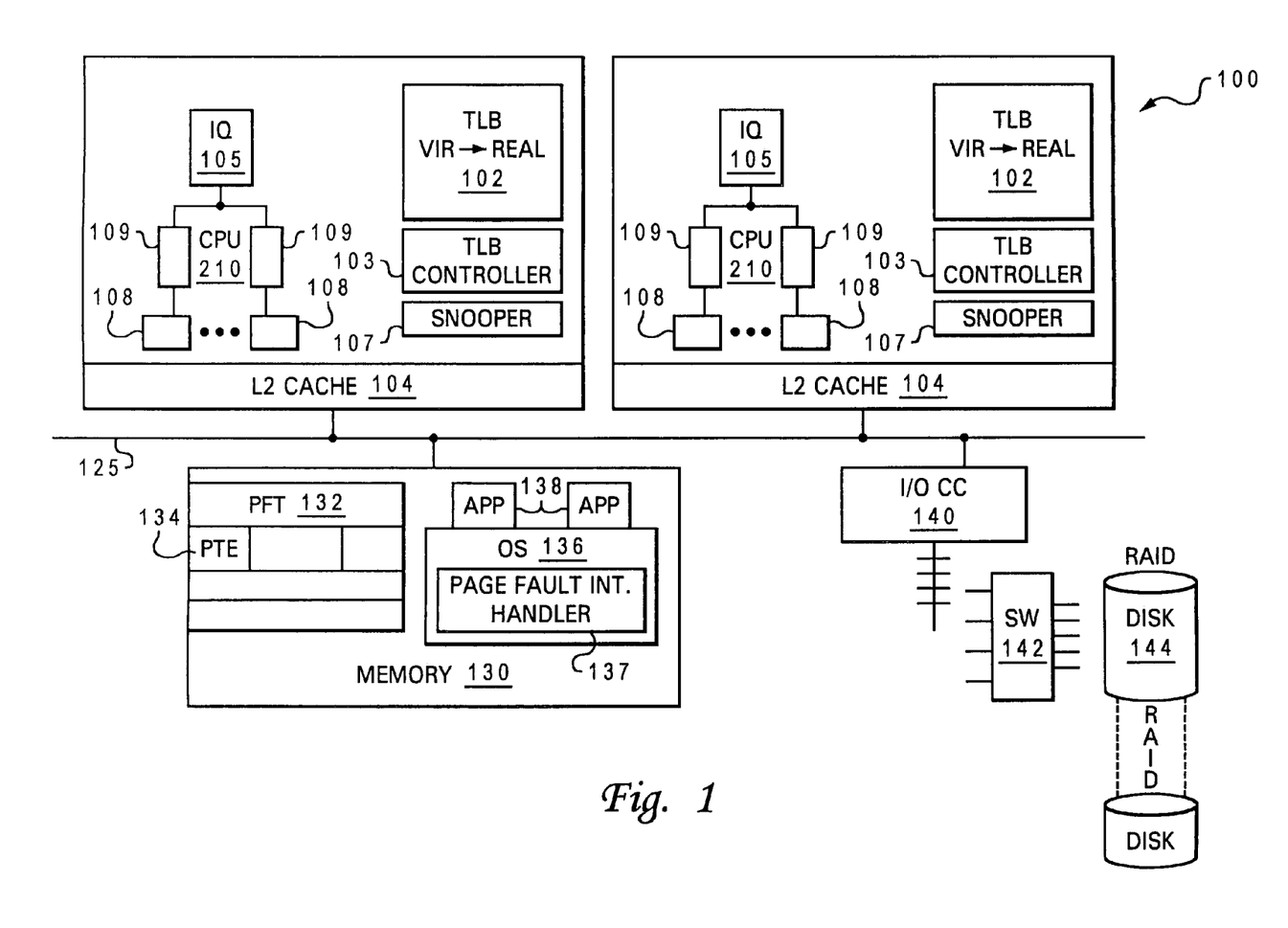
FIG. 1 is a block diagram illustrating components of a symmetric multiprocessor data processing system (SMP) including internal components of the processors and memory within which the features of the present invention may advantageously be implemented.

As further illustrated within FIG. 1, processor 101 includes L2 cache 104, translation look-aside buffer (TLB) 102 and associated TLB controller 103. TLB 102 is utilized to efficiently translate the effective or virtual addresses for instructions into the corresponding real addresses found within memory 130. Additionally, in the illustrated embodiment, each processor 101 includes snooper 107, which is utilized to snoop TLBI operations on the interconnect 125 and forward TLBI operations to TLB controller 103 according to one embodiment described below.

Processor 101 also comprises Instruction Sequencing Queue (IQueue) 105, execution units 108 and associated execution queues 109 at the cache coherency level (i.e., the level of processing at which address only operations are utilized to access the cache and lower memory). Instruction Sequencing Queue 105 holds memory access instructions with virtual addresses, and each execution queue 109 holds instructions being sent to a particular execution unit 108 at the cache coherency level for execution (i.e., following a generation of the address instruction at a load/store unit (LSU) of the processor). For example, execution units may include separate units for executing (or completing) load, store, and pre-fetch operations at the cache coherency level. Correspondingly, execution queues comprise separate queues for instruction sequencing unit (ISU) or LSU issued instructions (fetch, load and store, etc.)

TLB 102 is utilized to substitute the virtual addresses for address instructions (or data) in instruction queue 105 with real addresses prior to the instructions being sent to execution queues 109. Thus, when the instructions within queue 109 complete operations that involve memory addresses, they are queued with the real addresses translated from the corresponding virtual addresses.

Stored within memory 130 is page frame table (PFT) 132, which includes several page table entries (PTE) 134. Also included within memory are operating system (OS) 136 and executing applications programs 138, which are collectively responsible for providing the instructions to the processors 101 that result in the memory access operations that require TLBs. During operation, the central processing unit (CPU) of processor 101 fetches, decodes, and executes instructions (and data) of a computer program such as application program 138 (or OS 136). OS 136 is responsible for generating TLBIs that are sent to the processors 101 for traditional memory management. Specifically, OS 136 includes page fault interrupt handler 137 that generates a TLBI when a page fault occurs at the PFT 132. The processes by which the TLBIs are generated is similar to current systems and further attention is not provided to this process as generation of the TLBIs is not a primary focus of the invention.

In addition to the above components, data processing system 100 comprises Input Output (I/O) Channel Controller (CC) 140, which is coupled to interconnect 125. I/O CC 140 provides connection to I/O devices, including Redundant Array of Disk (RAID) 144, via switch 142. RAID 144 stores instructions and data that are loaded to memory as needed by the applications being executed by the processor.

Those skilled in the art will recognize that a computer system may include other components, including, for example, additional processors and multiple levels of caches, and that only those components necessary to provide a complete description of the invention are described herein.

Figure 2:
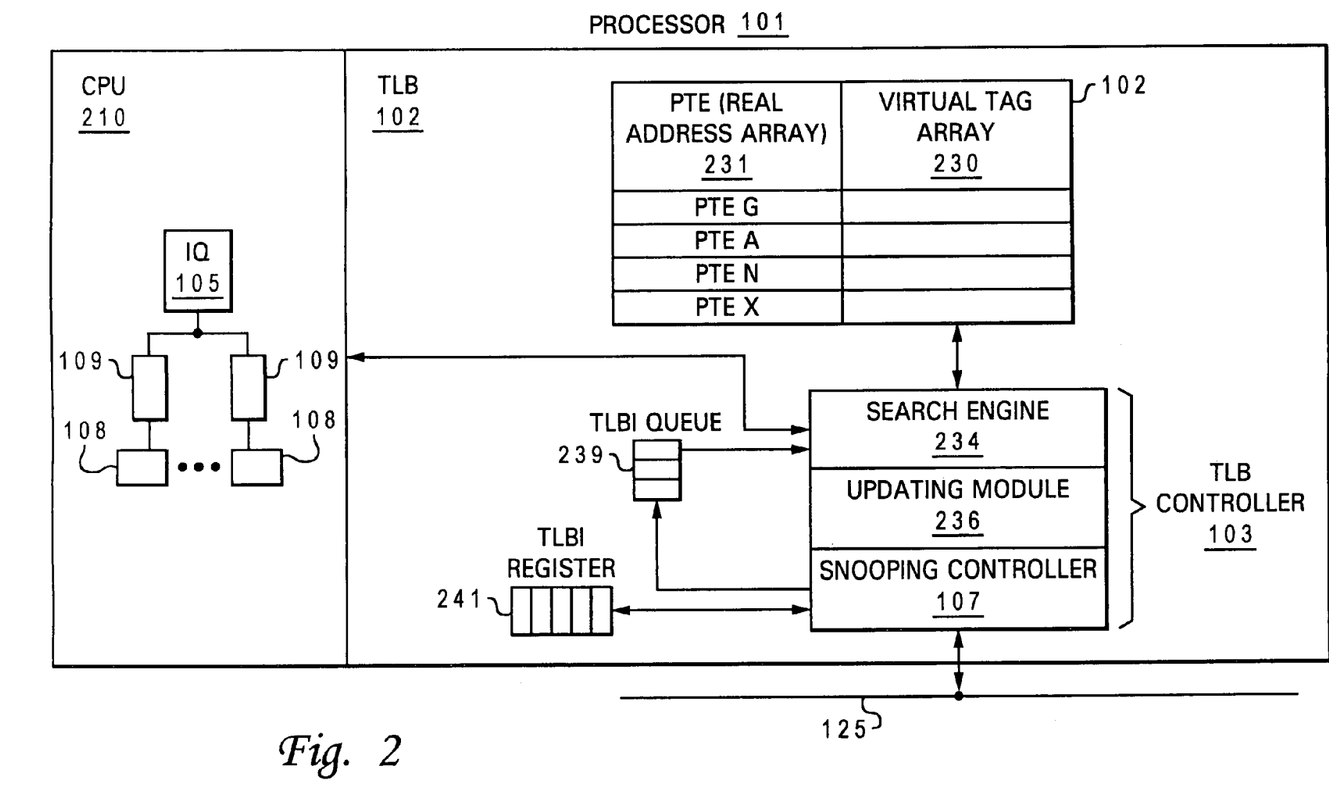
FIG. 2 is a block diagram illustrating an expanded view of a TLB subsystem of the processor of FIG. 1 configured with a TLBI queue and a TLB register utilized for tracking completion of multiple, overlapping TLBI operations on the data processing system in accordance with one embodiment of the invention.

FIG. 2 illustrates a more detailed view of the TLB subsystem within processor 101 configured to support the various functional features of the invention described below. For discussion purposes, only one processor 101 is illustrated and the external components to which processor 101 may be coupled are not provided. It should be understood that the components illustrated within processor 101 are also found within other processors (not shown) of a multiprocessor system in which the invention is practice. For example, multiprocessor system 100 of FIG. 1.

Processor 101 comprises CPU 210, which includes instruction sequencing queue 105, execution units 108, and execution unit queues 109. Processor 101 also comprises TLB subsystem 202. As shown, TLB subsystem 202 comprises TLB 102 which includes: (1) virtual address tag array 230 for storing virtual addresses of the pages memory; and (2) real address tag array 231 for storing the real addresses corresponding to the virtual addresses.

TLB subsystem 202 further comprises TLB controller 103 utilized to detect changes to PTEs and for updating PTEs in TLB 102 when PTE changes are detected. TLB controller 103 includes a snooping controller (snooper) 107, which constantly snoops interconnect 125 for operations that might affect translations in TLB 102, such as TLBIs.

TLB controller 103 also includes search engine 234 for searching virtual address tag array 230 and updating module 236 for updating or invalidating PTEs in real address tag array 231. Search engine 234 is also used by CPU 210 to look up address translations. When snooping controller 238 detects operations on interconnect 125 that affects a PTE, search engine 234 searches virtual address tag array 230 for the virtual address that was detected by snooping controller 238. If the virtual address is found in virtual address tag array 230, updating module 236 then updates or invalidates the particular PTE.

Associated with TLB controller 103 are TLBI queue 239 and TLBI register 241. In the illustrative embodiment and as described below, TLBI queue 239 is utilized to schedule multiple TLBIs that are to be sent to TLB 102, while TLBI register 241 is utilized to track completion of multiple overlapping TLBIs issued by different processors on the interconnect 125 of the multiprocessor system. The specific functionality and applicability of TLBI queue 239 and TLBI register 241 are provided in greater detail below.

I. TLBI Protocol Within Master Processor

The invention provides a new TLBI protocol that directs how a master processor (i.e., the processor that issues the request for a translation, which ultimately results in the generation of a TLBI) responds to executing the TLBI instruction. The TLBI protocol is a pre-established set of procedures followed by the receiving processor that ultimately enables multiple processors within a partition of the multiprocessor system to concurrently issue TLBIs on the interconnect. Also, the implementation of the TLBI response protocol eliminates the need for a processor to first acquire a global lock on the PFT before issuing a TLBI operation to the interconnect. Thus, the invention eliminates the need for and latency involved with conducting a lock acquisition operation, which includes lock contention, system synchronization, followed by lock release.

Figure 3:
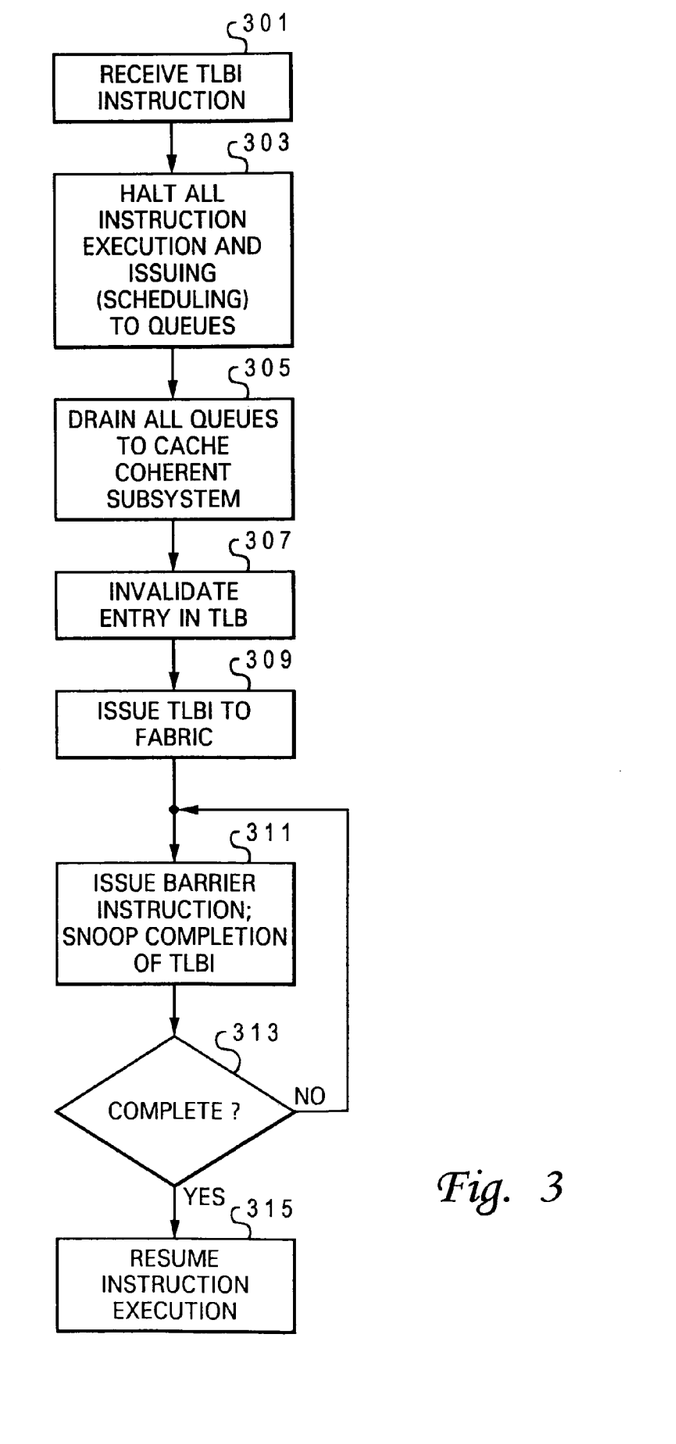
FIG. 3 is a flow chart illustrating the process by which the processors of FIG. 1 respond to the receipt of a TLBI and manage a TLBI operation according to one embodiment of the invention.

Referring now to FIG. 3, there is illustrated a flow chart of the process by which a processor responds to the receipt of a TLBI generated by the OS 136 based on the implementation of the TLBI response protocol of the invention. The process begins at block 301, which shows the processor 101 receiving a TLBI. For traditional virtual memory management, the OS generates the TLBI that is sent to a processor 101.

Prior to the receipt of a TLBI instruction, the processor 101 continues scheduling address operations (or instructions) in queues at the cache coherency level and executing the instructions at the cache coherency level based on their queued order. Once the TLBI is ready for execution, processor 101 immediately halts (or suspends) scheduling and execution of all instructions (at the cache coherency level) as indicated at block 303. Meanwhile, the processor drains all of the execution queues at the cache coherency subsystem as shown at block 305. The TLB controller of the processor then invalidates the corresponding TLB entry based on the PTE address as indicated at block 307. Draining of the queues involves removing all instructions from within the queues and signaling the particular processor component(s) generating the address instructions to re-send the drained address instructions once the TLBI operation completes on the system.

In one implementation, once a TLBI is received at the processor, a flag is set indicating which queues were active at the moment in time the TLBI is received. Accordingly, a flag is set for each TLBI that is snooped. Scheduling of instructions is suspended while the flag is set. The TLBI protocol forces the processor to wait until the active queues are drained before resetting the flag and enabling scheduling to resume.

After all the execution queues have been drained of instructions, processor 101 issues the TLBI instruction out on the interconnect (i.e., interconnect 125) as shown at block 309. Processor 101 then issues a barrier instruction to the fabric (system bus) to track completion of the TLBI at each of the other processors. Both the TLBI and the barrier instructions are snooped by the snoopers of the other processors. When the other processor is still busy draining its queues, the other processor may send a retry to the master processor forcing the master processor to retry the TLBI at a later time. Additionally, the barrier operation may be retried by the snooper when the queues are still active.

Processor 101 snoops the return of a completion message for the barrier operation from each of the other processors as shown at block 311. A determination is made at block 313 whether the TLBI completion message has been received from all of the other processors in the multiprocessor system. When the master processor receives a completion message from every processor within the multiprocessor system, the master processor resumes the execution of address instructions as shown at block 315.

According to one embodiment, described below with reference to FIGS. 7B and 7C, a hardware based method of tracking completion of the TLBI operation is implemented, which eliminates the need for initiating the barrier operation on the system bus. Thus, one functionality of the TLBI protocol includes responding to the TLBI instruction as a local barrier instruction, halting all cache coherency level execution until the execution queues drain and the TLBI completion is tracked across the multiprocessor system.

Notably, if a TLBI operation from a second processor is snooped while the master processor is waiting on the completion message from the other processors, the TLB controller of the master processor invalidates the PTE in the TLB (if the entry is present) and can immediately issue a completion message back to the second processor whose TLBI operation is snooped. The master processor has already drained its queues when the second TLBI is received, and the master processor does not lock out the other processor that issued the overlapping TLBI operation on the interconnect.

II. Speculative and Non-Speculative Instruction Scheduling During TLBI Completion As described in the above embodiment, the TLBI response protocol forces a suspension of instruction execution and a draining of the instructions queues at the cache subsystem level (also referenced herein as cache coherency level). When execution resumes, the instructions are re-issued from the LSU with their virtual addresses and sent to the TLB for address translations and then scheduled in the execution queues for execution. The address translation, scheduling, and load/store execution may utilize numerous clock cycles during which period the execution units at the cache subsystem have to wait on the instructions to be queued prior to resuming execution.

The invention eliminates (or substantially reduces) the period of inactivity for the execution units by continuing to translate, schedule, and execute instructions that are within the instruction queue when the TLBI is executed by the master processor. The invention thus allows out-of-order, speculative instruction execution while the TLBI operation is waiting on the completion message from the other processors (following the initial draining of the queues). This speculative execution significantly reduces the amount of time required for the master processor to resume execution once the TLBI operation completes.

To implement the out-of-order, speculative instruction execution feature, two different treatment of instructions are provided based on their position relative to the TLBI. Instructions that are ahead of the TLBI (i.e., receive a translation before the TLBI invalidates an entry in the TLB) are scheduled normally, while those instructions following the TLBI are scheduled speculatively. The different treatment of the instructions is described below.

A. Speculative Scheduling Via Virtual Address Tag

Since the TLBI operation has not yet invalidated the PTE in the TLB when the virtual addresses of the instructions ahead of the TLBI are translated, the translation is "speculatively" completed. These instructions, with their translated real addresses, are forwarded to the queues and are "speculatively" scheduled. The virtual address of the instruction(s) may later be invalidated by the TLBI, and thus the instruction is said to be speculatively scheduled with respect to the uncertainty of its real address.

Figure 4:
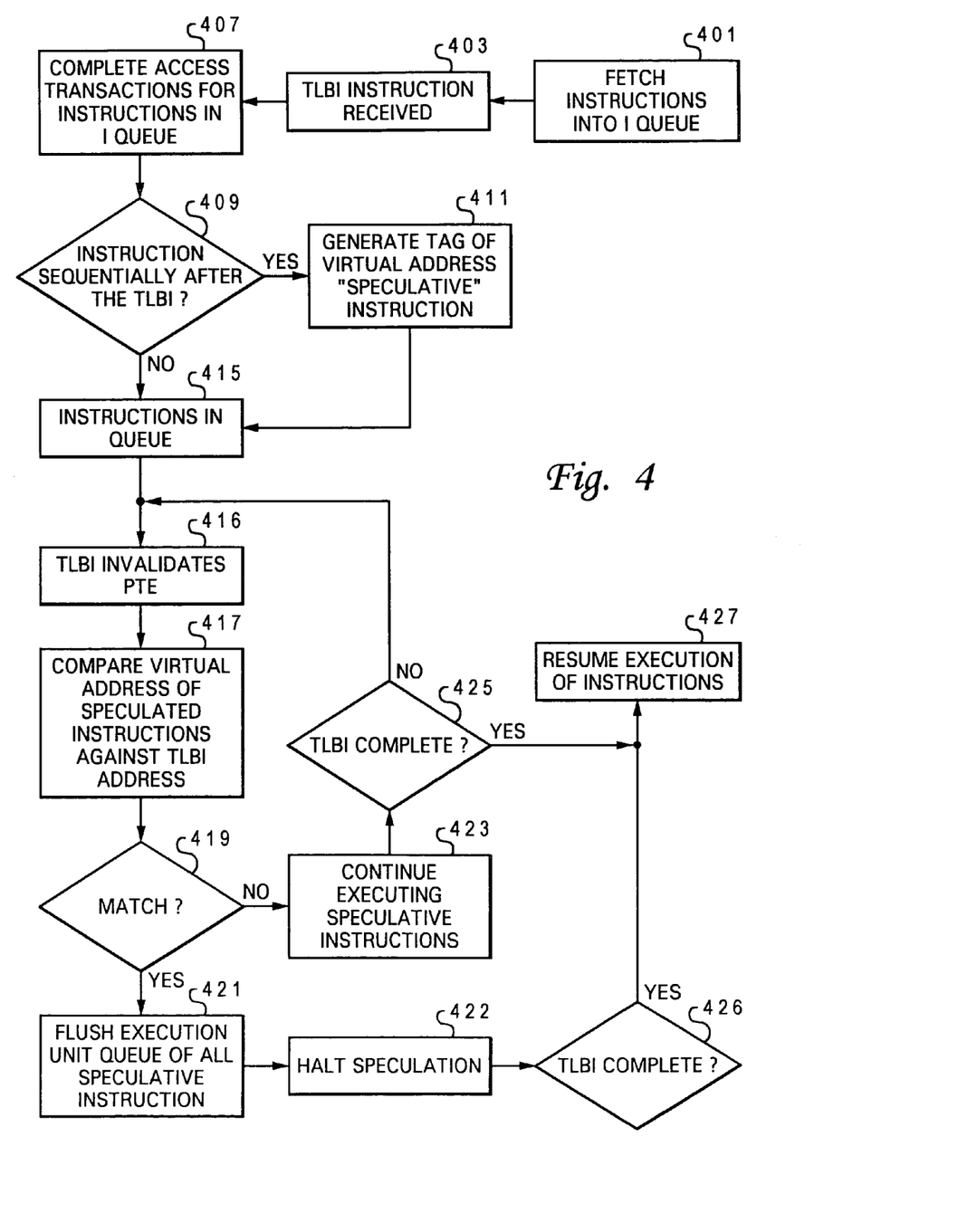
FIG. 4 is a flow chart illustrating a process of handling instructions whose addresses are translated before and after a TLBI received by a processor completes its operation according to one embodiment of the invention.
Figure 5A:
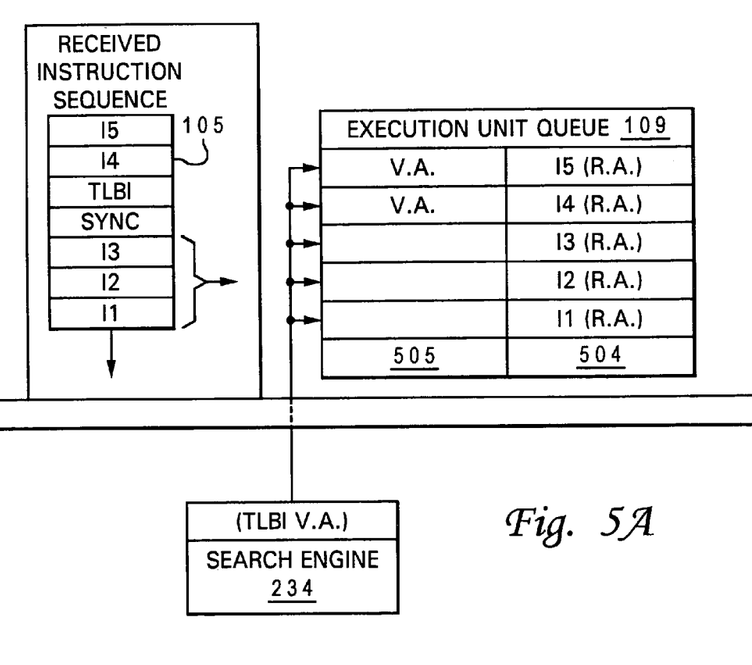
FIG. 5A is a block diagram illustrating a queue of an execution unit within a processor that includes both virtual and real address tags for instructions that are speculatively scheduled while a TLBI operation is completing on the processor according to one embodiment of the present invention.

Turning now to FIG. 5A, there is illustrated a block diagram of an instruction sequencing queue 105 of a processor that includes multiple instructions, including a TLBI. Instruction sequencing queue 105 comprises instructions sequentially ahead of TLBI (i.e., I1 to I3) and instructions sequentially after TLBI (i.e., I4 and I5). Also illustrated in FIG. 5A is execution unit queue (E-queue) 109, in which instructions I1 to I5 are scheduled for execution according to the process illustrated by FIG. 4.

With reference now to FIG. 4, there is illustrated a flow chart of the process by which the processor and TLB controller logic implementing the TLBI response protocol manages the scheduling of instructions from the I queue 105 during completion of the TLBI operation. Instructions are fetched into the I queue 105 and forwarded to the TLB 102 during regular processing as shown at block 401. The TLBI instruction is then received as shown at block 403. The TLBI instruction is scheduled for access to the TLB after the instructions sequentially ahead, and the instruction fetcher continues to fetch subsequent instructions into the I queue 105 as shown at block 405. Thus, when the TLBI is received by the processor 101, rather than halting all processing involved with the scheduling of instructions I1, I2, and I3 within I queue 105, the TLBI response protocol allows the instructions I1, I2, and I3 (and later I4 and I5) to proceed to the TLB 102 for address translation as shown at block 407.

Following each translation, a determination is made by the processor and TLB controller logic at block 409, whether the instruction is sequentially after the TLBI (i.e., whether the instruction is sequentially after the TLBI but granted access to the TLB 102 before the TLBI completes the invalidation of the corresponding PTE). If the instruction is sequentially after the TLBI, a tag is generated with the virtual address of the instruction as depicted at block 411. The tag indicates that the particular instruction is being speculatively scheduled. The instructions are scheduled within the E-queue 109 as shown at block 415. As shown in FIG. 5A, instructions that are speculatively scheduled are tagged with their virtual addresses, while the other non-speculatively scheduled instructions are not tagged.

Tagging the instructions as speculatively scheduled occurs because at the time the address translation occurs, the TLBI operation has not yet invalidated the target PTE in the TLB 102. The later invalidation of the PTE in the TLB 102 by the TLBI may affect one or more of the instructions (I4–I5) that received a translation, and thus these instructions are considered speculative. The instructions are therefore tagged with their virtual addresses (which were replaced with corresponding real addresses from the TLB 102), and the virtual addresses are later utilized to compare against the address targeted by the TLBI as described below.

Thus, execution unit queues 109 of the illustrated embodiment include the instruction with its translated real address 504, as well as a virtual address tag 505. According to the illustrative embodiment, to accommodate the virtual address tag 505, unit E-queue 109 is configured with wider spaces to support the additional virtual address parameter. Further, additional processing logic is provided within the processor (e.g., expanded TLB controller logic) to enable the virtual address of the instruction to be tagged to and forwarded along with the instruction to E-queue 109.

B. Flushing Speculatively Scheduled Instructions

Returning now to FIG. 4 and in particular to block 417, when the TLBI is sent to the TLB 102, the TLB 102 invalidates the corresponding PTE as shown at block 416, and then compares the virtual address tags 505 of the speculated instructions in E-queue 109 against the TLBI address as indicated at block 417. According to the invention, the TLB controller operating according to the TLBI response protocol causes the search engine 234 to execute a search of virtual address tags 505 and compare the addresses against the virtual address specified by the TLBI. Because the tags are clearly identified within the E-queue 109, the comparison of the TLBI address to the virtual address tags 505 within the E-queue 109 is easily completed.

A determination is made at block 419 whether a match is found within the virtual address tags 505. When a match is found, all the speculative instructions are flushed from the E-queue 109 as shown at block 421. Speculation is halted as indicated at block 422 and until a determination is made at block 426 that the TLBI has completed. Once the TLBI completes, the execution of instructions is resumed as indicated at block 427.

When a match is not found within the virtual address tags 505, however, the operations involving execution of the speculative instructions in the E-queue 109 continues as shown at block 423. The snooper 107 monitors for the TLBI completion messages, and a determination made at block 425 whether the TLBI operation has completed at all other processors. When the TLBI has completed at all other processors, the execution of instructions resumes as shown at block 427. Notably, the speculatively halted instructions, which were in the E-queue 109 when the TLBI operation completes are sent to the execution unit 108 without the virtual address tag.

In one alternative embodiment, the TLBI response protocol may cause only the matching instruction be removed from the queue. The other instructions within the queue, including the other speculatively scheduled instructions, are not affected. The subsequent resumption of execution following completion of the TLBI operation occurs with little disruption of the sequencing of instructions. Also, since the TLBIs will only invalidate a small percentage of the speculative instructions, significant benefits in processing efficiency are possible as only a small number of instructions have to be re-fetched and re-scheduled.

The above embodiment operates with a processor instruction set that includes a separate, but appended, address tag in which virtual addresses may be placed following the receipt by the processor of a TLBI. Alternatively, an expanded instruction that supports inclusion of both real and virtual addresses may be provided for memory access instructions being scheduled within the processor.

C. Separate Virtual Address Register for Speculatively Scheduled Instructions

Figure 5B:
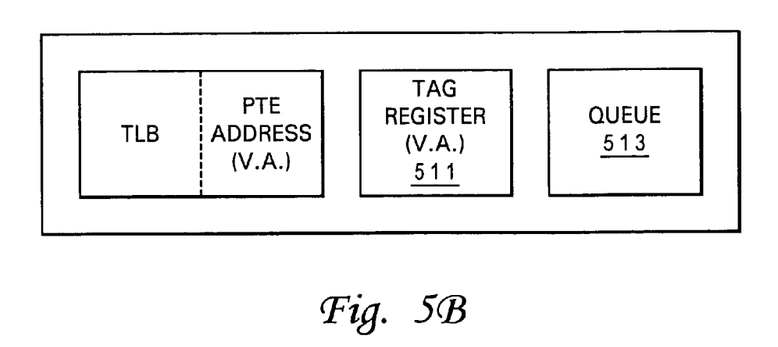
FIG. 5B is a block diagram illustrating a separate tag register for holding virtual addresses of instructions that are speculatively scheduled while a TLBI operation is completing on the processor according to one embodiment of the present invention.

In an alternative embodiment, the virtual addresses are not tagged to the instructions within the execution unit queue but are instead stored in a separate storage cache within the processor. FIG. 5B illustrates this implementation by which the virtual addresses of the speculatively scheduled instructions are uniquely tracked. As illustrated, in addition to E-queue 109, an additional tag address cache/register 511 is provided for caching the virtual addresses of all instructions that have been speculatively scheduled. According to this embodiment, when the virtual address is being replaced, the address is forwarded to and stored within the separate storage cache. The comparison of the TLBI virtual address is made against the addresses in the storage cache, and when a match occurs, the entire E-queue 109 is drained of instructions.

D. Non-blocking Issuance of Instructions Scheduled Subsequent to the TLBI

In another embodiment, the TLBI response protocol allows all the operations following the TLBI in scheduling sequence to be issued to the execution units without consideration for the TLBI operation in progress. The invention recognizes that these instructions will not contain invalidated real addresses because these instructions complete their translations at the TLB after the TLBI has invalidated the target PTE.

Thus, the TLBI operation is allowed to proceed asynchronously to the execution of the subsequent instructions. One benefit of this embodiment is that a processor is able to complete multiple TLBI operations while continuing to schedule other instructions asynchronously. In order to assist with this asynchronous scheduling of instructions from the TLBIs, a separate TLBI queue is provided along with the instruction queue.

1. Asynchronous, Parallel Scheduling of TLBIs in Separate TLBI Queue

Figure 6:
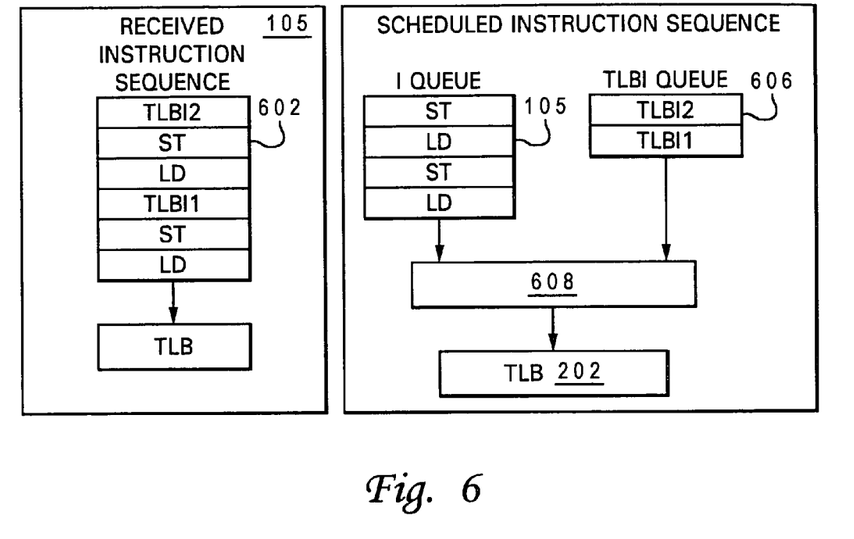
FIG. 6 is a block diagram illustrating a separate TLBI queue and instruction queue for storing TLBIs and regular instructions, respectively, which are executed asynchronously with each other according to one embodiment of the invention.

With reference now to FIG. 6, there is illustrated a block diagram representation of a processor designed with separate non-TLBI instruction queue 605 and TLBI queue 606 for receiving and scheduling access by the non-TLBI instructions (i.e., address instructions for completing memory access at the cache coherency level) and the TLBI instructions to the TLB 102. As shown, instruction sequence 602 includes TLBI1 and TLBI2. TLBI queue 606 is controlled by snooper logic and TLB controller. Snooper logic is utilized to forward TLBIs snooped on the interconnect directly to TLBI queue 606. TLBI queue 606 and instruction queue 605 are provided access to TLB 202 and the instructions are sequenced to TLB 202 via a FIFO sequencer 608. FIFO sequencer 608 forwards the instructions (TLBI or non-TLBI) to TLB controller in the order received, and the TLBIs and non-TLBI instructions are sent from their respective queues asynchronously with respect to each other.

Thus, when TLBIs are received at the master processor, the master processor does not have to schedule the TLBIs with the regular instruction stream. Instead, when a TLBI is received at the master processor, the TLBI is immediately sent to the TLB queue 606 for scheduling with previously received TLBIs. TLBIs within TLBI queue 606 are scheduled according to their order within TLBI queue 606. The TLBI protocol operates as described above; however, the implementation of FIFO sequencer 608 may merely be bus logic that controls access to the bus running to the TLB from the other processor components. Either implementation enables the TLBI protocol to handle the receipt of multiple TLBIs within the sequence of instructions to be completed by the processor.

The above configuration also enables the TLBI to be sent to the TLB ahead of non-TLBI instructions that may be generated and sent to the cache coherency level prior to the receipt of the TLBI. Scheduling TLBIs in a separate queue allows non-blocking issuing of invalidates to the TLB. Also, this configuration enables the TLBI to be issued on the interconnect without waiting on the instructions sequentially ahead of the TLBI to complete.

III. Tracking Multiple TLBI Completion Via Multi-Bit TLBI Register

One notable benefit provided by the above response process is the introduction of a retry-less TLBI protocol. This is accomplished by making the master, which is executing a TLBI instruction, seem like a snooper and have each processor track completion of currently outstanding TLBI operations The processor's snooper therefore does not have to retry snooped TLBIs because of the outstanding (incomplete) TLBI operation of the processor. Thus, the invention provides a retry-less TLBI protocol, which is a direct result of the TLBI response protocol that is implemented by the OS and TLB controller.

In order to allow each processor to track the completion of concurrently executing TLBI operations, each processor is designed with a TLBI tracking register. In one embodiment, the TLBI tracking register is implemented as a software register, and the values are stored in a cache of the processor. However, in the embodiment illustrated in FIG. 2, the TLBI tracking register 241 is provided as a hardware register controlled by the TLB controller 226 (or snooper).

TLBI tracking register 241 is made up of a sequence of entries, with each entry in the sequence assigned to a particular processor within the multiprocessor system. The number of entries that make up the register may be equivalent to the number of processors in the multiprocessor system, although a larger or smaller number may be utilized in different implementations. Thus, for example, in an N-processor multiprocessor system, the first entry of each processor's TLBI register is assigned to track a TLBI issued by processor 1 and the Nth entry of each processor's TLBI register is assigned to track another TLBI issued by processor N. Additionally, the tracking register may be created as an array with N columns representing the number of processors and several rows, with each row being utilized to track a different TLBI issued by the same processor. According to this implementation, both a single processor and/or multiple processors may issue overlapping, concurrent TLBIs and the tracking of the completion of the overlapping, concurrent TLBIs is completed in an efficient manner. In the illustrative embodiment, a value of 1 indicates that the TLBI operation has not completed at the processor and a value of 0 indicates completion of the TLBI operation at that processor.

Figure 7A:
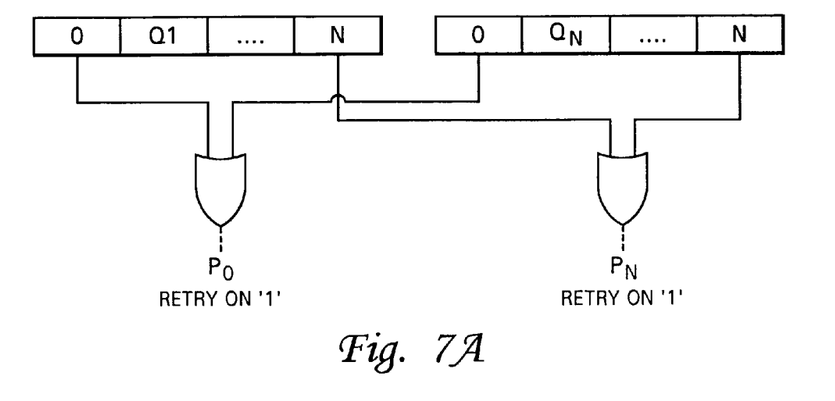
FIG. 7A illustrates TLBI registers in a logical configuration in which values are ORed together to determine completion of a particular processor's TLBI operation according to one embodiment of the invention.

FIG. 7A illustrates a logical representation of sample TLBI registers, each comprising N entries corresponding to processors P0 through PN in an N-processor multiprocessor system. The implementation of TLBI tracking register assumes that all processors complete TLBIs with non-blocking invalidates. In order for a TLBI operation to receive a system completion message, the TLBI operation must complete at each processor of the system. In one implementation, completion of the TLBI in a processor is indicated by the value of the corresponding bit in each of the TLBI tracking registers being set to 0.

Figure 7B:
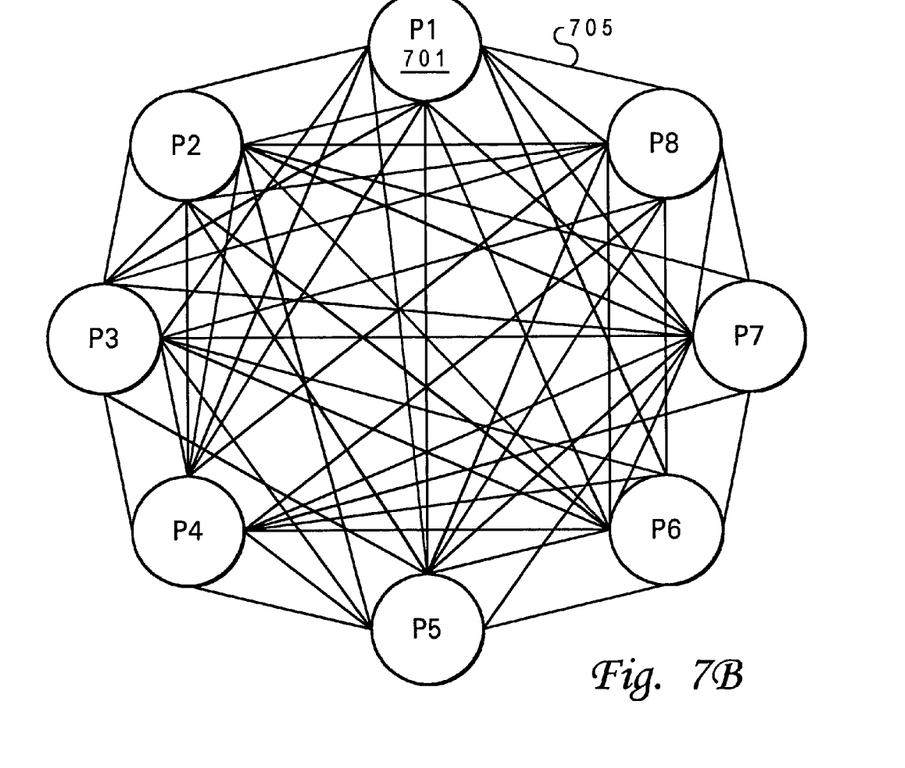
FIG. 7B illustrates a multiprocessor system configuration with each processor comprising a set of output and input bit register buses directly coupled to and from each other processor to enable direct tracking of TLBI registers according to one embodiment of the invention.

FIG. 7B is a linear representation of one hardware configuration of an 8-way multiprocessor system with each processor designed with the TLBI tracking register and interconnected to enable implementation of the retry-less TLBI protocol. Each processor 101 is identified by a reference number (i.e., 1 through 8), with each processor having a bus connection to every other processor. Processor 1 is directly coupled to each other processor via a single input pin and a single output pin that is utilized to communicate the values within TLBI tracking registers via bit register bus 705. According to the illustrative embodiment, processor 1 represents the master or requesting processor that has issued a TLBI operation on the system bus for completion. Thus, when processor 1 issues its TLBI, TLBI tracking register 241 is reset. Each of the other processors then tracks completion of the TLBI at their cache subsystem level. When the TLBI completes at a particular processor, that processor asserts its bit register bus 705, which results in the associated bit being set within TLBI tracking register 241. Thus, processor 1 is able to track completion of the TLBI operation issued on the system bus by merely checking the status of each bit in its internal TLBI tracking register 241.

Figure 7C:
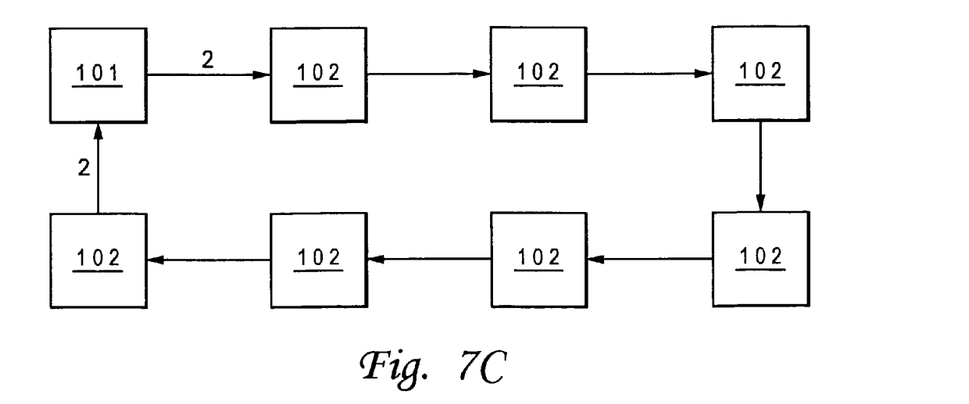
FIG. 7C illustrates a multiprocessor system configuration with each processor coupled via a single output and single input bit register bus to a pair of adjacent processors in accordance with one embodiment of the invention.

FIG. 7C illustrates a second configuration of interconnect processors of an 8-way multiprocessor system that supports the retry-less TLBI protocol. Unlike the direct processor-to-processor connection of FIG. 7B, however, the bit register bus of the present embodiment is a single circular bus. Thus, only two processors are connected to each other and updates to a TLBI tracking register of a processor not directly coupled to the processor that has completed the TLBI operation involves routing the completion signal across the other processors. This embodiment requires the bus to support addressed operations, which also identifies which particular bit within the tracking register is being updated. Although, additional wiring and logic is required for this configuration, this configuration is scalable to any size multiprocessor system, while the configuration of FIG. 7B is limited by the number of pins available for connecting off of a single processor chip in a one-to-one manner illustrated.

With the multiprocessor system configuration of FIGS. 7B and 7C, each processor is able to track completion of an outstanding TLBI operation without utilizing a barrier operation. Since each processor that completes the TLBI operation signals the requesting processor of the completion via the bit register bus, there is no need to have the processors issue barrier responses on the system bus to indicate completion of the barrier operation.

Figure 8:
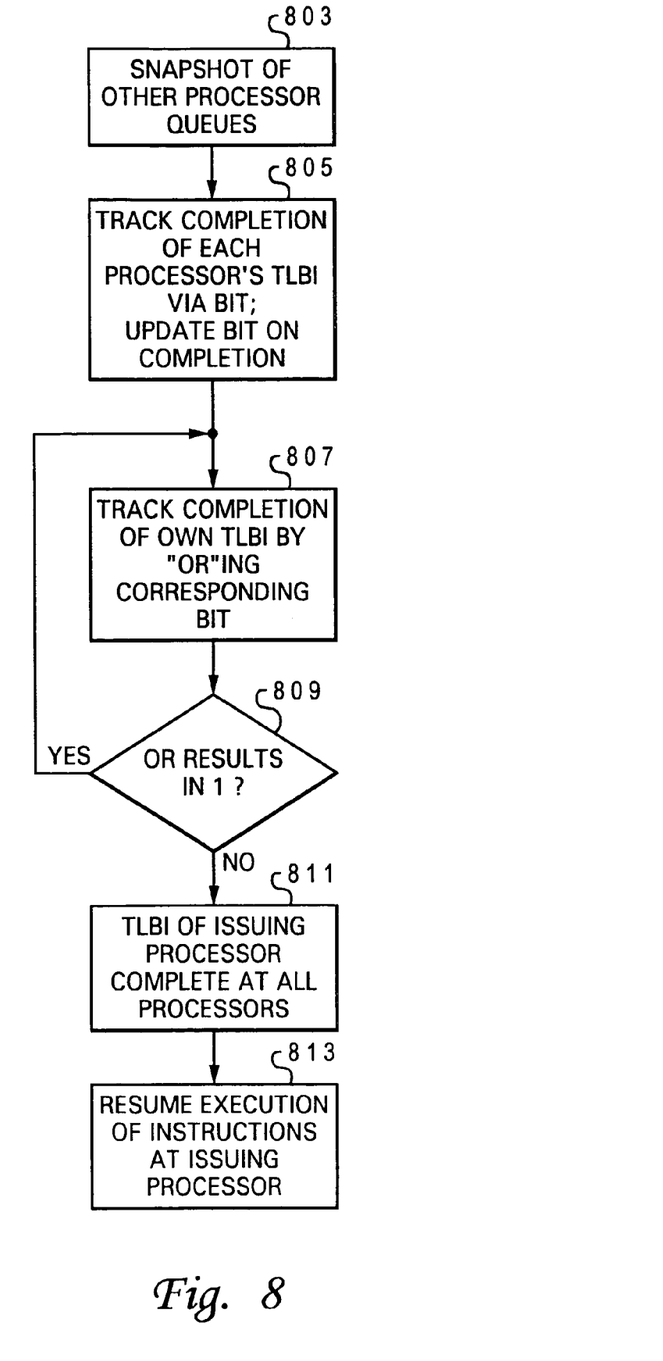
FIG. 8 is a flow chart depicting a process of determining completion of a TLBI operation utilizing the TLBI registers of FIG. 7 according to one embodiment of the invention.

FIG. 8 is a flow chart of the process by which the TLBI tracking registers are utilized to determine when the TLBI operation of a processor is completed. The process begins with the processor taking a snapshot of the TLBI tracking registers of the other processors as shown at block 803. The time at which the snapshot is taken may vary; however, for the present embodiment, the snapshot is taken at the moment a processor begins a TLBI operation (i.e., when a TLBI is issued out to the interconnect). The processor sets the values of its own TLBI tracking register to reflect the current state of the TLBI operations across the system.

Accordingly, each processor with an issued TLBI maintains and monitors an active TLBI tracking register until the TLBI completion message is returned to that processor. When a processor invalidates its PTE and has drained its execution unit queues in response to its own TLBI or one that is snooped, the bit within the TLBI tracking register corresponding to the processor that issued the TLBI is reset to 0 as indicated at block 805. Each processor tracks the completion of its own TLBI on the system by ORing the corresponding bit for each of the TLBI tracking registers as shown at block 807.

This tracking operation is further illustrated by FIG. 7A which illustrates the ORing of each corresponding entry (0-N) of the TLBI tracking arrays 710/711 within each processor, using OR functions 715/716 to determine completion of the particular processor's TLBI. For example, if TLBI operation of processor P0 completes at processor P2, the corresponding entry in processor P2's TLBI tracking array (slot 3) should have a value of 0. Thus, as shown in FIG. 7A, ORing all N entries corresponding to P0 yields a resulting value of 0 when all of P0's TLBI operations are completed in every processor and yields a value of 1 when any of the TLBI operations have not completed.

Returning to FIG. 8, a determination is made at block 809 whether the ORing of the bits resulted in a 1. When a 1 value results from the ORing operation, the TLBI has not completed and the issuing processor must continue to track completion of the TLBI operation. If the TLBI has not completed, the issuing processor waits and then re-checks the TLBI tracking array for an indication of the system-wide completion of the TLBI operation. Otherwise, when a 0 value results the processor's TLBI operation has completed on the system as shown at block 811, the issuing processor is then able to resume execution of the instructions by the execution units, as indicated at block 813.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A multiprocessor data processing system (MP) comprising:
 a plurality of processors including a first processor and a second processor coupled together by an interconnect, wherein each processor comprises a cache coherency subsystem including a translation look-aside buffer (TLB), at least one execution unit and an associated execution queue, wherein said execution queue holds queued address instructions with real addresses translated from corresponding virtual address by said TLB;
a memory coupled to said plurality of processors by said interconnect and which includes a page frame table (PFT) in which is stored a plurality of page table entries (PTEs) of virtual and real address translation pairs;
operating logic associated with each processor for implementing a TLB invalidate (TLBI) response protocol that controls a response by each of said plurality of processors to receipt of TLBIs; and
wherein, responsive to receipt of a TLBI by said first processor generated in response to a page fault at the PFT associated with a memory access operation of the first processor, said TLBI response protocol triggers said first processor to first drain queued address instructions from the execution queue of each of said at least one execution unit of said first processor before issuing said TLBI out on the interconnect, wherein said TLBI is snooped on the interconnect by the second processor only after draining of the execution queue has completed at said first processor.

2. The MP of claim 1, wherein further:
after completion of draining of said execution queue of each execution unit, said TLBI response protocol triggers said operating logic to issue said TLBI out on the interconnect; and
said TLBI response protocol further triggers said operating logic to provide:
means for immediately suspending processing of address instructions at said first processor when said TLBI is received;
means for monitoring for a receipt of a completion message from each of said plurality of processors other than said first processor, said completion message indicating completion of an invalidating of a corresponding entry within the TLB of each of the plurality of processors; and
means for said first processor to dynamically resume processing address instructions only after said completion message is received from each of said plurality of processors.

3. The MP of claim 2, further comprising:
a snooper associated with each of said plurality of processors, which snoops all transactions placed on the interconnect by other processors; and
wherein, responsive to said first processor issuing said TLBI out on the interconnect, a snooper of said second processor snoops said TLBI and forwards said TLBI to a TLB of said second processor.

4. The MP of claim 3, wherein:
responsive to a snoop by said snooper of said first processor of a second TLBI from said second processor while said execution queue is draining, said first processor retries said second TLBI.

5. The MP of claim 3, wherein:
responsive to a snoop of a second TLBI from said second processor, said first processor invalidates a corresponding entry in a first processor TLB; and
when the second TLBI is snooped while the first processor is waiting on the completion message from at least one of the plurality of processors, said first processor immediately issues a TLBI completion message for said snooped TLBI, such that no wait condition is encountered due to the prior draining of the first processor's queues.

6. The MP of claim 4, wherein, when said second processor snoops the first processor's TLBI after issuing said second processor's TLBI to the interconnect, said second processor invalidates an entry in a second processor's TLB corresponding to the first processor's TLBI and said second processor immediately issues a TLBI completion message for the first processor's TLBI, such that concurrent and overlapping TLBIs occur on the interconnect without either issuing processor requiring a lock on the PFT before issuing their respective TLBIs to the interconnect.

7. The MP of claim 1, further comprising:
an operating system (OS) that generates said TLBI received by said first processor and sends said TLBI to the first processor when a page fault occurs at said PFT; and
an application that provides an instruction stream to the execution unit of said processors, wherein said instruction stream includes memory access instructions that required a translation of a virtual address to a real address before being placed in the execution queue.

8. The MP of claim 7, further comprising:
processor operating means for forwarding said memory access instructions to said TLB in sequence to complete said translation;
wherein, said TLBI response protocol suspends processing of all instructions at said first processor and halts all forwarding of instructions until the TLBI completes at the other processors of the plurality of processors on said MP; and
means for resuming said forwarding of instructions following the completion of said TLBI.

9. The MP of claim 1, said TLBI response protocol further comprising processing logic for:
when the TLBI has been received by the first processor, setting a flag for each queue indicating which queues were active at the point of receipt of the TLBI;
suspending scheduling of instructions from an instruction queue for which a flag is set; and
resetting the flag when an active queue has completed draining its queued instructions, wherein scheduling instructions to a queue automatically resumes when the flag is reset and queues without a flag set continue to schedule instructions.

10. The MP of claim 1, wherein:
the TLBI issued to the interconnect includes a barrier function that triggers a return of the completion message from the other processors and suspends all cache coherency level execution until the execution queues of the first processor has drained and relevant entries within the other processors of the plurality of processors have been invalidated.

11. A method in a multiprocessor data processing system (MP) with a first processor and second processor for handling concurrent translation look-aside buffer invalidates (TLBIs) from said first processor and said second processor, said method comprising:
responsive to a receipt at said first processor of a TLBI generated in response to a page fault associated with a memory access operation of the first processor, immediately suspending execution of instructions at a cache coherency subsystem of said first processor;
invalidating a corresponding entry in a translation look-aside buffer (TLB) of said first processor;
draining all execution queues at said cache coherency subsystem of said first processor; and issuing said TLBI out to a system interconnect only after said execution queues have completed draining, wherein all queued address instructions are drained before issuing said TLBI out on the interconnect, and wherein the second processor on said interconnect snoops said TLBI on the interconnect only after draining of the execution queue has completed at said first processor.

12. The method of claim 11, further comprising:
resuming execution of instructions only after a TLBI completion message is returned from said second processor, said TLBI completion message being generated only after a corresponding entry in a TLB of said second processor has been invalidated.

13. The method of claim 11, further comprising:
snooping for an overlapping TLBI on said interconnect from said second processor, said overlapping TLBI issued on the interconnect by said second processor prior to a receipt of a TLBI completion message by the first processor; and
when said overlapping TLBI is snooped, retrying said overlapping TLBI if said execution queues of the first processor have not completed draining.

14. The method of claim 13, further comprising:
when said overlapping TLBI is snooped and said queues have completed draining, invalidating a corresponding entry in said TLB and immediately issuing a completion message to said second processor in response to said overlapping TLBI.

15. The method of claim 11, wherein said TLBI response protocol further comprises:
when the TLBI has been received by the first processor, setting a flag for each queue indicating which queues were active at the point of receipt of the TLBI;
suspending scheduling instructions from an instruction queue for which a flag is set; and
resetting the flag when an active queue has completed draining its queued instructions, wherein scheduling instructions to a queue automatically resumes when the flag is reset and queues without a flag set continue to schedule instructions.

16. A processing unit for utilization within a multi-processor system having multiple processors connected via an interconnect, said processing unit comprising:
one or more execution units each having a corresponding execution queue associated therewith by which instructions having a translated real address are scheduled for execution by the corresponding execution unit; and
a cache coherency subsystem connected to the execution queues of the one or more execution units, said cache coherency subsystem comprising:
a translation look-aside buffer (TLB) and associated TLB controller;
means for receiving instructions for executing at said executing unit, said instructions including a TLB invalidate (TLBI) generated in response to a page fault associated with a memory access operation of the processing unit; and
processing logic, responsive to a receipt of said TLBI, for implementing a TLBI response protocol that triggers a sequence of operations comprising: (1) first draining each execution queue of said processing unit and (2) then issuing said TLBI out on an interconnect mechanism.

17. The processing unit of claim 16, further comprising:
connectivity mechanism for coupling the processing unit to the interconnect and to external components, including another processor and a memory; and
means, responsive to a completion of a draining of each execution unit queue, for issuing said TLBI out on the interconnect means.

18. The processing unit of claim 16, wherein further said processing logic that implements the TLBI response protocol further comprises:
means for suspending processing of instructions when said TLBI is received, and
means for monitoring for a receipt of a completion message from each of said multiple processors other than a processor of said processing unit; and
means for resuming processing of instructions at said processing unit only when said completion message is received from all of said multiple processors.

19. The processing unit of claim 17, further comprising:
a snooper, which snoops all transactions placed on the interconnect by said external components; and
wherein, responsive to a snoop of a processor-issued TLBI on said interconnect, said TLBI response protocol forwards said processor-issued TLBI to said TLB, invalidates a corresponding entry in a first processor TLB, and immediately issues a TLBI completion message for said snooped processor-issued TLBI.

20. The processing unit of claim 19, further comprising means for resuming forwarding instructions following the completion of said TLBI.

* * * * *